May 29, 1962  R. E. MITTON  3,036,436
FLUID PRESSURE CONTROL APPARATUS
Filed April 11, 1961
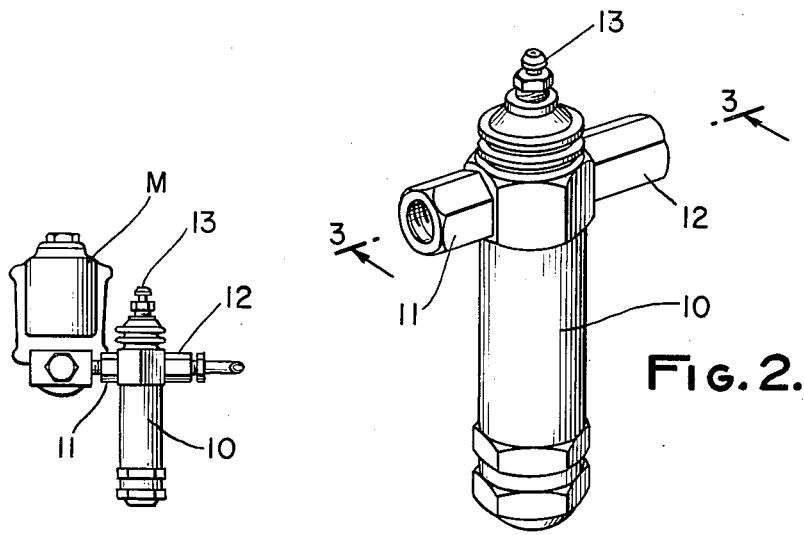
Fig.1.
Fig.2.
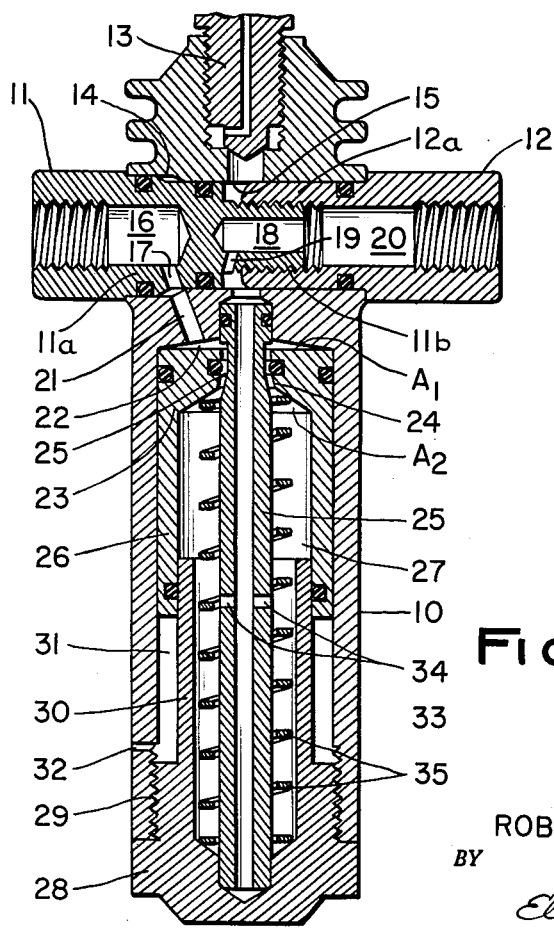
Fig.3.
INVENTOR.
ROBERT E. MITTON
BY
Elliott & Pastoriza
ATTORNEYS

United States Patent Office 3,036,436
Patented May 29, 1962

3,036,436
FLUID PRESSURE CONTROL APPARATUS
Robert E. Mitton, San Diego, Calif., assignor, by mesne assignments, to Hydro-Ventricle Brake Co., a corporation of California
Filed Apr. 11, 1961, Ser. No. 102,199
2 Claims. (Cl. 60—54.5)

This invention relates to a fluid pressure control apparatus and more particularly to an improved fluid pressure amplifying device primarily useful in automobile power brakes.

The objects of this invention are similar to those set forth in my co-pending patent application Serial No. 91,369, filed February 24, 1961, now abandoned, for Fluid Pressure Control Apparatus. In the foregoing application, there is disclosed a fluid pressure control apparatus including a cylindrical body having a fluid pressure inlet at one end and a fluid pressure outlet at the opposite end. The design of the device is such that up to a given inlet fluid pressure a corresponding outlet fluid pressure would be provided, and as soon as the given inlet fluid pressure was exceeded, the outlet fluid pressure would become a multiple of the inlet pressure. By such an arrangement, a desirable control for an automobile could be realized in that the power action of the brakes would not be exercised except when the brakes were fully applied by the user. When only a small amount of braking is used, the device has effectively no influence on the pressures involved.

In the instant invention, there is provided a similar fluid pressure apparatus which has as its primary object to provide an improved inlet and outlet fluid means which may be more readily adapted to different types of automobiles and in which the actual physical connection and disconnection of the device to such automobiles is enormously simplified.

Another object is to provide an improved fluid pressure control apparatus which is of a simpler construction as to many component parts than devices heretofore proposed so that reliability in operation is increased and actual manufacturing expense is decreased.

Briefly, these and many other objects and advantages of this invention are attained by providing an elongated cylindrical body as in my prior patent application. However, rather than having the outlet connection at the lower end of the body, the outlet connection is brought out from the upper end of the body in axial alignment with the fluid input connection. A piston is provided within the body and guided in up and down movement by a central stem as in my prior application. In the instant case, however, the stem is hollow and communicates with the interior of the cylinder beneath the piston, the upper end of the stem communicating with the outlet structure at the upper end of the cylindrical chamber. By this arrangement, the stem serves the dual function of a guide for the piston and also as a communication means for transmitting outlet fluid pressure from the chamber below the piston to the outlet connection.

With both the inlet and outlet structure disposed at the same end of the elongated body, installation is greatly simplified. Further, by employing removable inlet and outlet connecting members, they may be readily removed and replaced by other members of different diameter or thread size so that the device may be adapted to many different types of cars.

A better understanding of the invention will be had by now referring to the accompanying drawings, in which:

FIGURE 1 is a diagram of the improved fluid pressure control apparatus of this invention connected between the master brake cylinder and brake drum line;

FIGURE 2 is a perspective view of the apparatus itself; and

FIGURE 3 is an enlarged cross section taken in the direction of the arrows 3—3 of FIGURE 2.

Referring to FIGURES 1 and 2, the device comprises an elongated body 10 having a fluid inlet member 11 connected to the master brake cylinder M and fluid outlet member 12 adjacent the same upper end portion of the body connecting to a fluid line L leading to the brake drum. Preferably, the inlet and outlet members 11 and 12 are in axial alignment. Also shown is a small bleeder screw 13 closing an upper bore opening communicating with the interior of the body 10 for permitting air to escape when filling the body.

In the operation of the device shown in FIGURE 1, inlet hydraulic fluid pressure from the brake master cylinder M of the automobile and outlet fluid pressure to the line L are maintained the same up to a given inlet fluid pressure level. After this given pressure level has been exceeded, the outlet pressure from 12 becomes a multiple of the inlet pressure so that an amplification of the pressure takes place.

Referring now to the enlarged cross section of FIGURE 3, the manner in which the foregoing pressure characteristics are realized will be evident. As shown, the inlet member 11 includes an enlarged base portion 11a and smaller nipple end portion 11b. The nipple 11b is externally threaded as shown. The outlet member 12 on the other hand terminates in an internally threaded structure 12a for receiving the external threads of the nipple 11b. By this arrangement, the members 11 and 12 may be inserted into opposite ends of the body 10 and threaded together.

To accommodate these members, the upper end of the body 10 includes a transverse bore having a large diameter entrance portion 14 tapering downwardly to a reduced diameter portion 15. The base portion 11a of the member 11 is received within the bore portion 14 and the smaller nipple portion 11b within the bore portion 15.

The inlet member 11 also includes an interior bore 16 communicating with a transverse passage 17 in turn passing into the annular space defined by the shoulder portion between the bore 14 and bore 15. The end portion of the inlet member 11 shown at 11b also includes an internal bore 18 communicating through a passage 19 with the reduced diameter bore portion 15. The end portion of the member 12 includes an internal passage 20 for communicating with a suitable outlet conduit connection. As shown, the bores 16 and 20 for the inlet and outlet members 11 and 12 are respectively threaded to receive suitable hose connections.

With the above arrangement, the members 11 and 12 may be unthreaded and removed without requiring any disassembly of the body 10. Other members having different threads for connection to the cylinder and brake drum chambers may be substituted so that the body 10 can be used with many different types of cars.

As shown, the upper portion of the body 10 includes a passage 21 passing from the upper region 22 of the body through passage 17 to inlet member 11. Within the upper body portion there is provided a piston 23 having a central opening 24 surrounding the upper portion of a stem 25. As shown, the stem includes a constricted area 25' so that when the piston 23 is in its uppermost position, there is provided an annular passage between the constricted area 25' and the opening 24 in the piston head. This annular passage places the upper region 22 above the piston 23 in communication with the lower interior of the chamber below the piston 23.

As shown, the piston includes a downwardly extending annular sidewall 26, the interior surface thereof together with the exterior surface of the stem 25 defining a lower chamber region 27.

The extreme lower end of the elongated body member 10 is closed by a plug 28 threaded to the lower end of the tube 10 as at 29 and including an upwardly extending annular wall 30. The exterior of the wall 30 and the interior of the walls of the cylinder 10 define an annular space 31 for receiving the downwardly depending annular wall 26 of the piston 23. A small air bleeder port 32 permits air to escape from the annular space 31 when the downwardly extending annular wall 26 of the piston 23 is moved into the annular space 31.

The central tubular stem 25 itself includes a central passage 33 and lateral ports 34 placing the passage 33 in communication with the region 27 below the piston 23. As shown, the passage 33 within the stem communicates with the upper portion of the body 10 passing from the reduced bore 15 and thus is placed in communication through the passage 19 with the outlet member 12. The outlet member 12 is thereby in fluid communication with the interior chamber below the piston 23 where as the inlet fluid member 11 is in communication with the interior chamber above the piston 23.

The top area of the piston 23 is designated $A_1$ in FIGURE 3. The effective bottom area of this piston is designated $A_2$, and it will be evident that $A_2$ is less than $A_1$. A coil spring 35 normally biases the piston 23 to its uppermost position as shown, wherein the central opening 24 encircles the restricted area 25' of the stem so that the upper portion 22 is in fluid communication with the lower portion 27.

In the operation of the device as shown in FIGURE 3, inlet fluid pressure will bear against the area $A_1$, but until this pressure exceeds the pressure exerted by the spring 33, the piston will remain in its uppermost position so that the fluid pressure will be communicated through the annular passage about the constricted neck area of the stem 25 to the lower portion of the piston 23. This fluid pressure will then be communicated through the passages 34 to the central passage 33 and the stem 25 and to the outlet member 12. Thus, variations in the inlet fluid pressure will provide corresponding variations in the outlet fluid pressure so long as the inlet fluid pressure remains below a given value determined by the strength of the coiled spring 35.

If now the inlet fluid pressure exceeds the given pressure, as would occur for example in a power brake action under an emergency, the piston 23 will be urged downwardly as a consequence of the greater area $A_1$ over the area $A_2$. As the piston moves downwardly, the constricted portion 24 will engage the enlarged normal outside diameter portion of the stem 25 in sealing engagement, thereby cutting off the communication between the upper and lower chamber regions. Since the area $A_1$ is larger than the area $A_2$, the pressure in the region 27 below the piston 23 will be greater than that in the region 22 above the piston so that the outlet pressure will then become a multiple of the inlet pressure in accordance with the ratio of the areas $A_1$ over $A_2$. A fluid amplification therefore takes place and will only take place after a given pressure determined by the spring 35 is exceeded.

Insofar as the foregoing operation as described is concerned, it is similar to that set forth in my co-pending patent application. The particular advantage of the structure shown in FIGURE 3 corresponding to this particular invention is the elimination of additional fluid ports, the only necessary ports in the stem assembly being those shown at 34. Also, the advantage of having both the inlet and outlet means at the same end of the cylinder is present so that installation of the device is greatly simplified.

While only one particular embodiment of the invention has been shown and described, the improved fluid pressure control apparatus is not to be thought of as limited to the one example set forth.

What is claimed is:

1. An apparatus for varying fluid pressure comprising, in combination: a body having an interior chamber; a fluid inlet means in one end of said body; a fluid outlet means adjacent said one end of said body; piston means within said chamber; and a hollow stem passing centrally through said chamber and piston means, said piston means being adapted for sealing engagement with said stem over a majority of the length of said stem, said inlet means being in communication with said chamber on one side of said piston; and said outlet means being in communication with the hollow interior of said stem, said hollow interior opening out into said chamber on the other side of said piston means so that said outlet means is in communication with said other side of said piston means, the side of said piston means in communication with said inlet means having an area upon which inlet pressure acts differently from the area on the opposite side of the piston means upon which outlet pressure acts, said stem defining a passage area adjacent to one end of said body such that when said piston means is adjacent to said one end, it is no longer in sealing relationship with said stem so that fluid is free to pass from one side of said piston through its central portion around said stem passage area to the other side, and whereby fluid pressure at said outlet means is equal to the fluid pressure at said inlet means until said piston is moved along said stem to effect sealing engagement therewith.

2. An apparatus for varying fluid pressure comprising, in combination: a body having an interior chamber; a fluid inlet means in one end of said body; a fluid outlet means adjacent said one end of said body; piston means within said chamber; and a hollow stem passing centrally through said chamber and piston means, said piston means being adapted for sealing engagement with said stem over a majority of the length of said stem, said inlet means being in communication with said chamber on one side of said piston; and said outlet means being in communication with the hollow interior of said stem, said hollow interior opening out into said chamber on the other side of said piston means so that said outlet means is in communication with said other side of said piston means, the side of said piston means in communication with said inlet means having an area upon which inlet pressure acts differently from the area on the opposite side of the piston means upon which outlet pressure acts, said body including a bore passing transversely through said one end, said bore having a first portion of given diameter merging into a second portion of reduced diameter, said one side of said piston communicating with said first bore portion and said hollow interior of said stem communicating with said second bore portion; said fluid inlet means including a plug member having an enlarged outside diameter portion and a reduced diameter nipple portion receivable in said first and second bores respectively and said fluid outlet means including an outlet member having a reduced diameter portion receivable in said reduced bore portion and threadedly receiving said nipple portion of said inlet member, whereby said inlet and outlet members may be removed and replaced by members having different internal dimensions to enable adaptation of said apparatus to different type connections.

References Cited in the file of this patent

UNITED STATES PATENTS 2,282,556    Bowen _____ May 12, 1942